US005901333A

United States Patent [19]

Hewitt

[11] Patent Number: 5,901,333

[45] Date of Patent: May 4, 1999

[54] VERTICAL WAVETABLE CACHE ARCHITECTURE IN WHICH THE NUMBER OF QUEUES IS SUBSTANTIALLY SMALLER THAN THE TOTAL NUMBER OF VOICES STORED IN THE SYSTEM MEMORY

[75] Inventor: Larry Hewitt, Austin, Tex.

[73] Assignee: Advanced Micro Devices, Inc., Sunnyvale, Calif.

[21] Appl. No.: 08/687,859

[22] Filed: Jul. 26, 1996

[51] Int. Cl.[6] ...................................................... G06F 13/00

[52] U.S. Cl. .............................. 395/872; 84/602; 84/604; 711/129; 711/132

[58] Field of Search .................................... 395/872, 876; 711/132, 129, 118; 84/602, 604

[56] References Cited

U.S. PATENT DOCUMENTS

| | | | |
|---|---|---|---|
| 4,503,501 | 3/1985 | Coulson et al. | 364/300 |
| 5,111,727 | 5/1992 | Rossum | 84/603 |
| 5,357,623 | 10/1994 | Megory-Cohen | 395/425 |
| 5,376,750 | 12/1994 | Takeda et al. | 84/602 |
| 5,442,747 | 8/1995 | Chan et al. | 395/164 |
| 5,446,237 | 8/1995 | Abe et al. | 84/617 |
| 5,537,635 | 7/1996 | Douglas | 395/456 |
| 5,680,573 | 10/1997 | Rubin et al. | 395/456 |

FOREIGN PATENT DOCUMENTS

WO 96/18995 6/1996 WIPO .

*Primary Examiner*—Thomas C. Lee
*Assistant Examiner*—Albert Wang
*Attorney, Agent, or Firm*—Skjerven, Morrill, MacPherson, Franklin & Friel, L.L.P.; Ken J. Koestner

[57] ABSTRACT

A wavetable cache for an audio synthesizer which synthesizes music signals from voice data in a pooled memory uses a vertical architecture cache to communicate data from the memory to an audio signal processor. The vertical architecture cache includes a substantially limited number of queues, corresponding to only a fraction of the voices stored in the main memory and processed in the audio signal processor. A plurality of samples are transferred in a batch mode from the memory via a system bus to a queue. The samples are subsequently processed and accumulated for the entire plurality of samples by the audio signal processor. The limited number of queues are shared among the different voices in a round-robin fashion.

25 Claims, 7 Drawing Sheets

VERTICAL WAVETABLE CACHE ARCHITECTURE IN WHICH THE NUMBER OF QUEUES IS SUBSTANTIALLY SMALLER THAN THE TOTAL NUMBER OF VOICES STORED IN THE SYSTEM MEMORY

BACKGROUND OF THE INVENTION

1. Field of the Invention

The present invention relates to computer systems including an audio interface. More particular, the invention relates to a cache memory for supplying audio signal data to an audio performance device over a system bus.

2. Description of the Related Art

Many present-day computer systems, such as personal computer systems, incorporate multimedia devices such as audio peripherals, motion video peripherals, graphics systems and the like. The multimedia devices are commonly implemented as add-in cards of desktop and portable computers or integrated circuit designs for installation on a system circuit board.

Audio peripherals are commonly available as digital audio systems using a standard Musical Instrument Device Interface (MIDI) serial communication protocol for performance of audio voice signals. One type of audio peripheral is a wavetable-type music synthesizer that uses classic filter, amplifier, and modulation circuits to produce many various musical sounds. A wavetable device synthesizes musical signals from multiple oscillation signals that are stored in a memory, sampled, and synthesized in a plurality of waves in rapid succession. Two fundamental components of a wavetable audio synthesis device are a memory for storing wavetable data and musical signal processing circuits, including a digital signal processor.

An important aspect of the performance of a wavetable audio synthesis device is the effectiveness of the data transfer path between the memory and the musical signal processing circuits. Some systems increase the bandwidth between the memory and the musical signal processing circuits by supplying the musical processing circuits with a local memory interface. However, supplying a local memory in combination with the audio circuits substantially increases the cost and size of the audio peripheral. Furthermore, requiring a special local memory subsystem in combination with the audio peripheral complicates device installation, generally increasing servicing and warranty costs to a manufacturer. Furthermore, the wavetable data must be downloaded to the local memory subsystem, complicating software handling of the audio peripheral and causing delays when data is replaced.

Many advantages are gained by supplying the wavetable data in standard system memory. The general procedure for handling data in a computer system is through the main system memory. Therefore, operating system software generally handles data in a most efficient manner through usage of the main system memory. Data entries from all peripheral storage devices, including magnetic disks, CD-ROM, and the like, are transferred through the main system memory.

However, one problem with the usage of main system memory for supplying wavetable data is the limited bandwidth between the memory and the musical signal processing circuits via the system bus.

One technique for supplying audio data from a wavetable memory 100 within a system pooled memory 102 to an audio processor 104 uses a "horizontal" wavetable cache structure and involves storing music signals as a plurality of voice music signals in the memory 102, accessing a small amount of voice data from memory locations determined substantially at random, and communicating the voice music signals to the audio processor 104 over a system bus 106 a few samples at a time, as illustrated in FIG. 1. The audio processor 104 processes one sample of a plurality of voices, for example 32 voices, in parallel. The data are transferred from the memory 102 to the audio processor 104 via a multiple-queue cache 108 with one queue allocated to each voice. The data are requested from the memory 102 one voice at a time. Data requested for each voice memory access is transmitted to a queue of 32 queues that are allocated one voice per queue. Each queue has a small capacity, for example 32 bytes. The audio processor 104 receives data from one queue to create one sample, processes the sample that corresponds to one voice, then proceeds to the next queue to read the next voice in turn, processing each voice once after processing 32 samples. The amount of data in each of the 32 voice queues is monitored so that a request is made for a particular voice when the amount of data in the voice queue becomes too small. In the horizontal structure, the multiple-quene cache 108 holds samples for each of the synthesizer voices simultaneously, One problem with the horizontal wavetable cache structure is that the multiple communications of voice data cause congestion on the system bus, impacting the performance of the audio synthesizer.

What is needed is an improved apparatus and technique for communicating data from the main system memory over a system bus to an audio device peripheral.

SUMMARY OF THE INVENTION

In accordance with the present invention, a wavetable cache for an audio synthesizer that synthesizes music signals from voice data in a pooled memory uses a vertical architecture cache to communicate data from the memory to an audio signal processor. The vertical architecture cache includes a substantially limited number of queues, corresponding to only a fraction of the voices stored in the main memory and processed in the audio signal processor. A plurality of samples are transferred in a batch mode from the memory via a system bus to a queue. The samples are subsequently processed and accumulated for the entire plurality of samples by the audio signal processor. The limited numbers of queues are shared among the different voices in a round-robin fashion.

Many advantages are attained by the system and operating method disclosed herein. One advantage is that the audio synthesizer consumes a substantially reduced portion of the system communication bandwidth. A second advantage is that the size of the memory in the audio synthesizer is reduced while performance improves. Another advantage is an improved handling of latencies arising through the operation of the system bus.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE PREFERRED EMBODIMENTS

Figure 2:
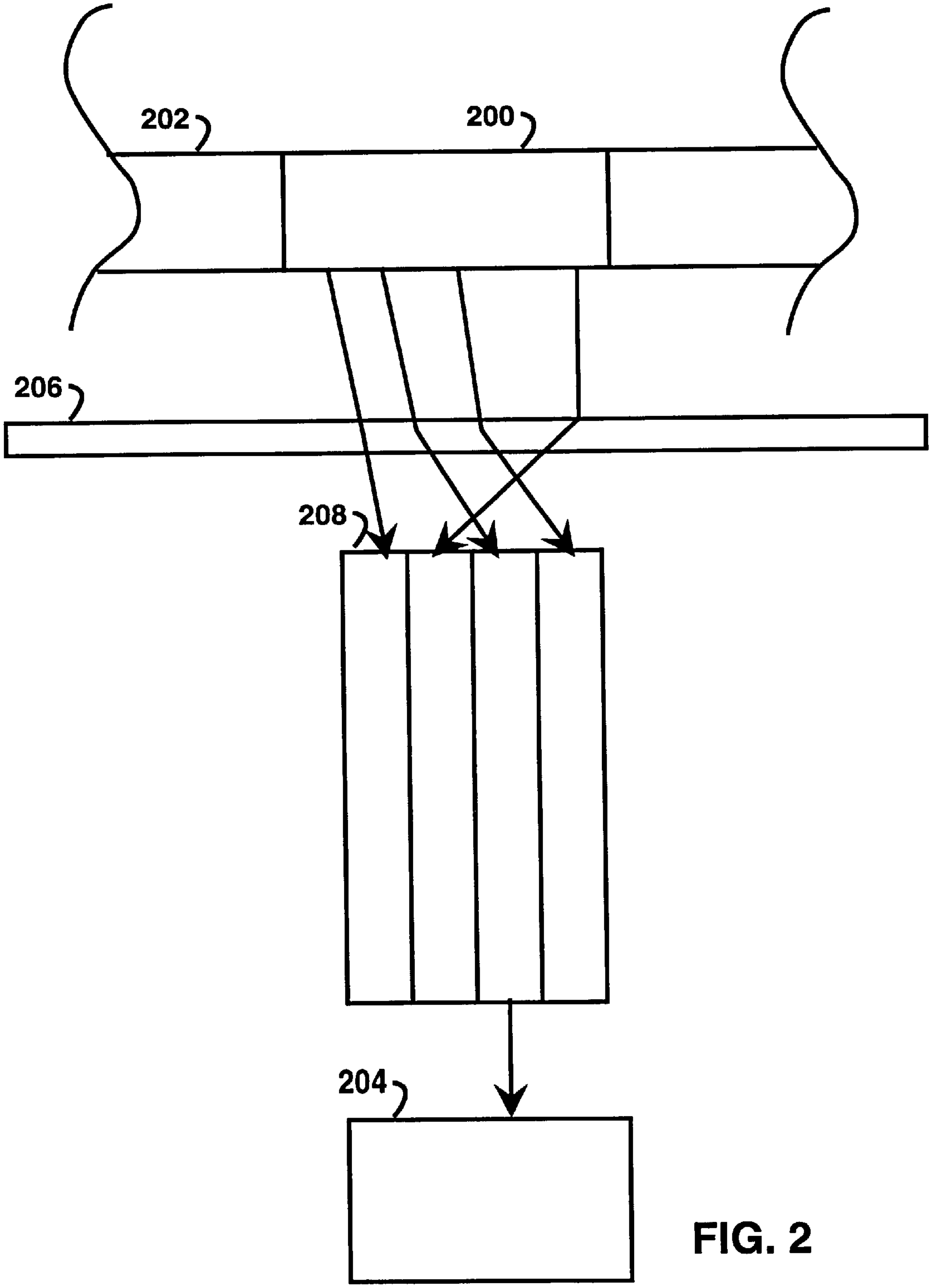
FIG. 2 is a pictorial schematic diagram showing a vertical caching technique for communicating voice music data from a system memory over a system bus to a voice data queue for subsequent audio processing in accordance with an embodiment of the present invention.

Referring to FIG. 2, a pictorial schematic diagram illustrates a vertical cache structure for communicating voice music data from a wavetable memory 200 within a system memory 202 over a system bus 206 to a voice data queue 208 for subsequent audio processing by an audio processor 204. The voice data queue 208 includes queues for only a fraction of the total number of voices stored in the system memory 202 and performed by the audio processor 204 so that each queue has a large depth, for example 128 bytes, in comparison to a voice data queue that includes a queue for each voice. The audio processor 204 processes 32 frames of a single voice at one time, rather than one frame of all voices as in a horizontal method. The system bus 206 delivers a sufficient number of samples to the voice data queue 208 for the audio processor 204 to receive up to 32 frames from the queue, the specific amount of data received being dependent upon the sample rate conversion frequency ratio $F_c$ of the voice.

In the illustrative embodiment, four queues are supplied to allow the system bus 206 to fill queues for voices to be subsequently processed by the audio processor 204, although other numbers of queues may be used, depending on factors such as the amount of data in each voice, the sample rate conversion frequency ratio $F_c$ of the voice, and the number of voices to be processed.

Figure 1:
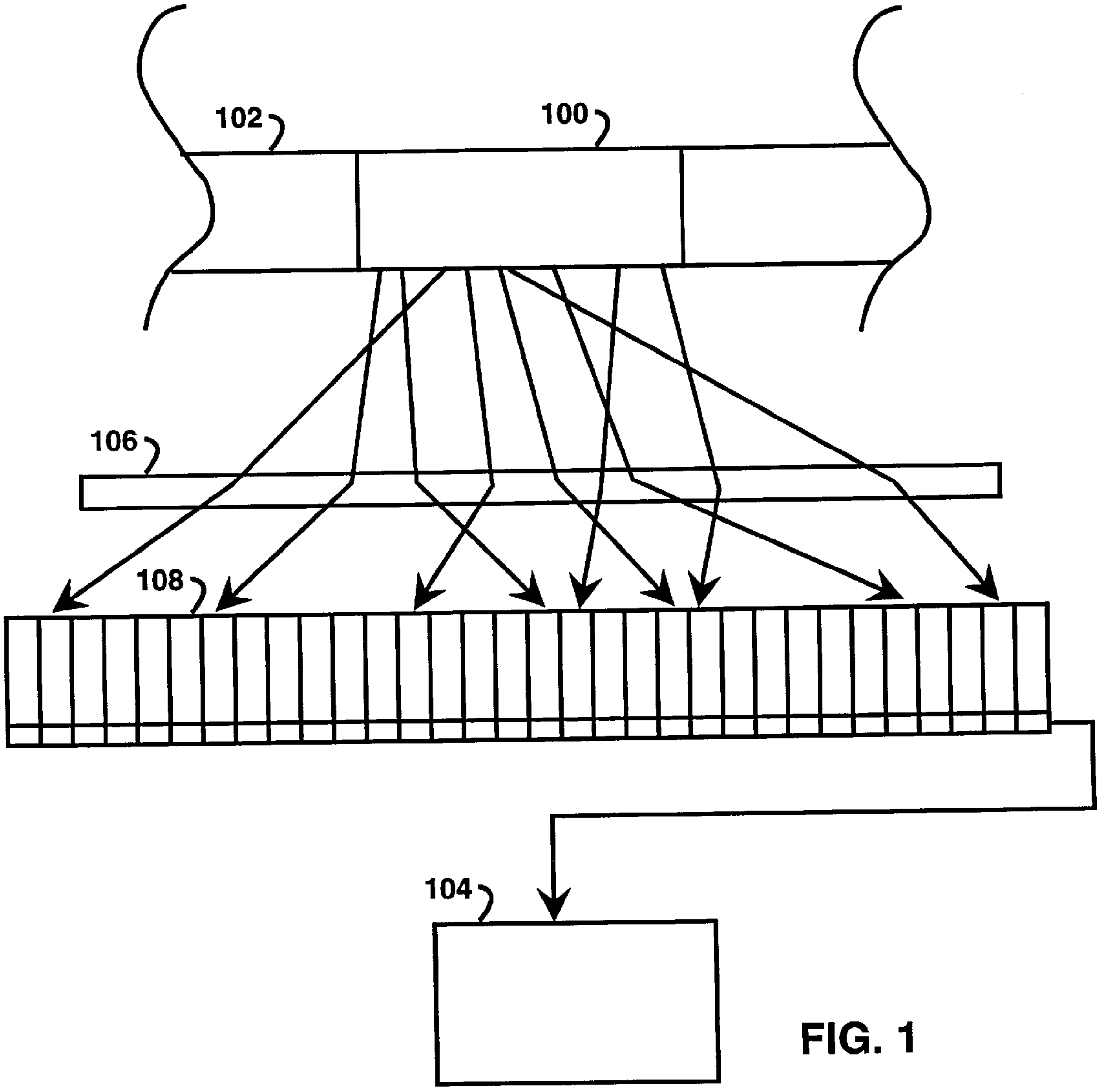
FIG. 1 PRIOR ART
FIG. 1, labeled prior art, is a pictorial schematic diagram showing a conventional horizontal caching technique for communicating voice music data from a system memory over a system bus to a voice data queue for subsequent audio processing.

One advantage of the vertical cache structure is a reduction in queue memory size while substantially increasing the amount of queued data for each voice. In the example illustrated by FIGS. 1 and 2, the horizontal structure includes 32 queues of 32 bytes for a total storage of 1024 bytes and the vertical structure includes 4 queues of 128 bytes for a total storage of 512 bytes. Another advantage of the vertical queue structure is a substantial improvement in bus efficiency that is attained because the vertical caching method bursts up to 128 bytes of voice data at a time rather than the maximum of 32 bytes that are communicated by the horizontal caching method.

Figure 3:
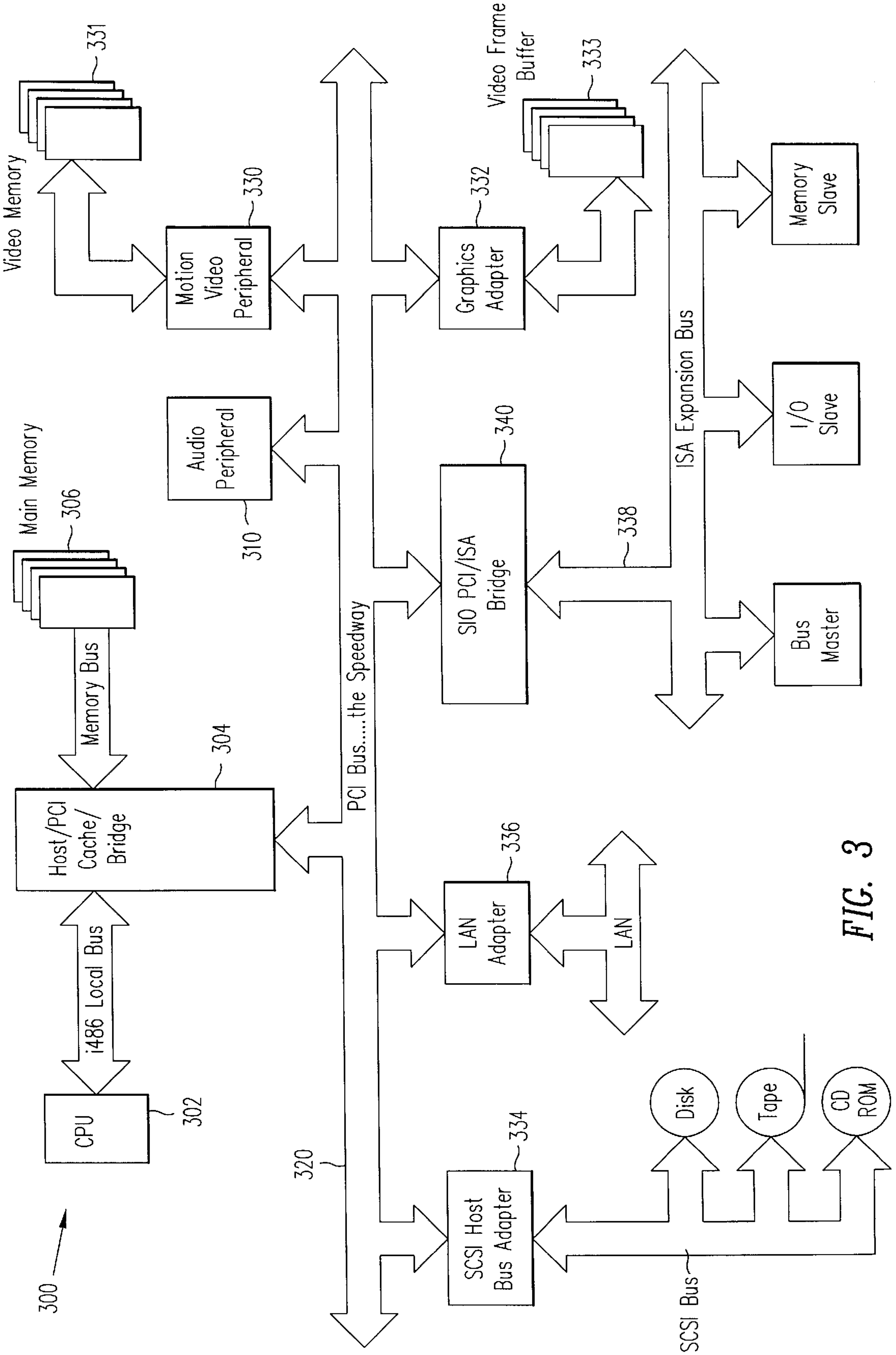
FIG. 3 is a schematic block diagram illustrating a computer system incorporating an audio wavetable synthesizer integrated circuit in accordance with one embodiment of the present invention.

FIG. 3 illustrates an audio performance computer system 300 including an audio wavetable synthesizer integrated circuit 310. The computer system 300 employs an architecture based on a bus, such as an Intel™ PCI bus interface 320, and includes a central processing unit (CPU) 302 connected to the PCI bus interface 320 through a Host/PCI/Cache interface 304. The CPU 302 is connected to a main system memory 306 through the Host/PCI/Cache interface 304. A plurality of various special-purpose circuits may be connected to the PCI bus interface 320 such as, for example, the audio wavetable synthesizer integrated circuit 310, a motion video circuit 330 connected to a video memory 331, a graphics adapter 332 connected to a video frame buffer 333, a small systems computer interface (SCSI) adapter 334, a local area network (LAN) adapter 336, and perhaps a expansion bus such as an ISA expansion bus 338 which is connected to the PCI bus interface 320 through an SIO PCI/ISA bridge 340.

The audio wavetable synthesizer integrated circuit 310 accesses musical voice data in several different voices and processes the multiple voice data into a single set of audio signals, such as stereo audio signals, although other audio formats such as three-output, five-output, theater-in-the-home formats and other audio formats are also possible. A voice data signal is a single defined sound such as a note of one instrument, a digital audio file, or a digital speech file.

The audio wavetable synthesizer integrated circuit 310 advantageously supplies high-quality, low-cost audio functions in a personal computer environment. The audio wavetable synthesizer integrated circuit 310 supports logic functions and digital signal processing for performing audio functions typically found in personal computer systems. The audio wavetable synthesizer integrated circuit 310 incorporates a polyphonic music synthesizer and a stereo code. The audio wavetable synthesizer integrated circuit 310 generates audio signals based on data that is received from the main system memory 306, rather than through a local memory interface. Accordingly, performance of the audio wavetable synthesizer integrated circuit 310 is highly dependent on the bus communication structures of the computer system 300. In one embodiment, the audio wavetable synthesizer integrated circuit 310 addresses up to 64 Mbytes of system memory 306 and generates an audio signal including up to 32 simultaneous voices.

Various embodiments of the computer system 300 use operating systems such as MS-DOS™, Windows™, Windows 95™, Windows NT™ and the like.

Figure 4:
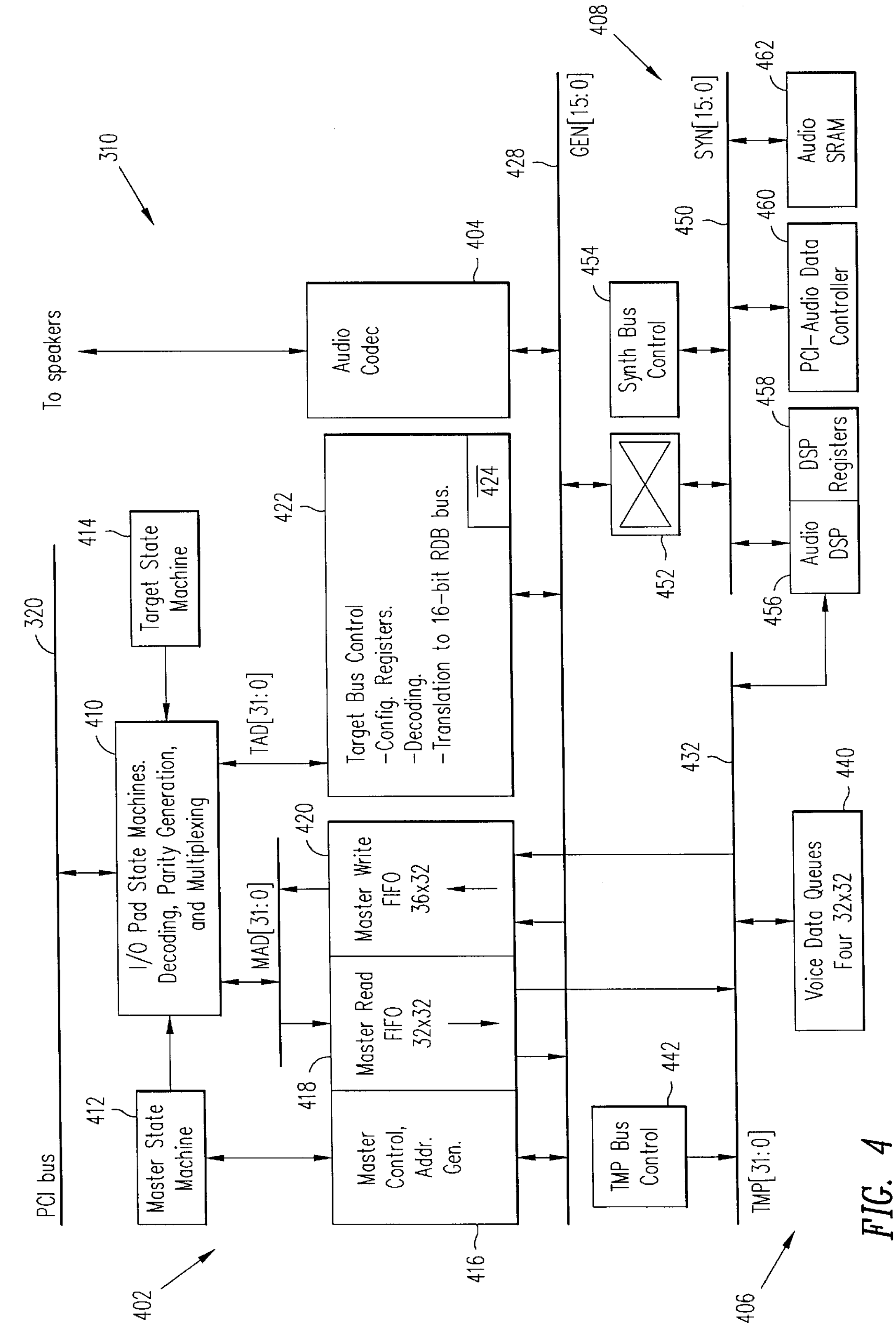
FIG. 4 is a schematic block diagram illustrating an embodiment of the audio wavetable synthesizer integrated circuit for performing logic and digital signal processing supporting audio functions and including a vertical wavetable cache in accordance with an embodiment of the present invention.

Referring to FIG. 4, a schematic block diagram illustrates an embodiment of the audio wavetable synthesizer integrated circuit 310 that performs logic and digital signal processing supporting audio functions implemented in a personal computer. The audio wavetable synthesizer 310 is connected to a PCI bus interface 320 and includes a PCI bus interface unit 402, an audio code 404, an audio cache 406, and an audio synthesizer 408.

The PCI bus interface unit 402 is connected between the PCI bus 320 and two buses internal to the audio wavetable synthesizer 310, specifically a general (GEN) bus 428 and a temporary (TMP) bus 432. The TMP bus 432 is internal to the audio cache 406. The audio cache 406 includes the TMP bus 432, a TMP bus control circuit 442 and a voice data queue 440. The TMP bus control circuit 442 and the voice data queue 440 are connected to the TMP bus 432.

The audio synthesizer 408 is connected to the GEN bus 428 and communicates via the PCI bus 320 through the PCI bus interface unit 402. The audio synthesizer 408 includes a 16-bit synthesizer bus 450 which is connected to the GEN bus 428 by a synthesizer bus interface 452. The audio synthesizer 408 includes a synthesizer bus controller 454, an audio digital signal processor (DSP) 456, a plurality of digital signal processor (DSP) registers 458, a PCI-Audio data controller 460, and an audio static random access memory (SRAM) 462. The audio DSP 456 is connected to the synthesizer bus 450 and connected to the TMP bus 432 of the audio cache 406. The synthesizer bus controller 454, the PCI-Audio data controller 460, and the audio SRAM 462 are connected to the synthesizer bus 450. The DSP registers 458 are connected to the audio DSP 456.

The audio DSP 456 processes the multiple voices of the digital musical signal by performing various known signal processing functions, most fundamentally by performing sample rate conversion and mixing. Sample rate conversion is performed to coordinate the input signal rate of a musical voice signal to an output audio rate since a single output rate is imposed and the input signals commonly may have multiple different sampling rates. For example, the output rate of the audio DSP 456 may be 44.1 kHz while the input rate of a signal such as a telephony-type code is 8 kHz so that the audio DSP 456 interpolates to generate an output signal at 44.1 kHz.

Furthermore, voice memory is conserved by storing a single voice musical system to represent multiple octaves of a note. The sample rate is converted to provide multiple harmonic key registers to a single stored note. For example, a voice file is typically recorded at the output frequency of the audio DSP 456 (44.1 kHz). A voice signal corresponding to a single key, for example a middle-C, is recorded at 44.1 kHz and saved in the memory so that the sample rate conversion frequency ratio $F_c$ is equal to one. To conserve memory, other harmonics of the voice signal such as a D or E is generated by reading the sample corresponding to a middle-C and converting the sample rate. The output frequency is increased by a full octave for an $F_c$ equal to two, and increased by two octaves for an $F_c$ equal to four.

The sample rate conversion frequency ratio $F_c$ represents the rate at which the audio wavetable synthesizer integrated circuit 310 processes a data file in the system memory 306. Thus, the sample rate conversion frequency ratio $F_c$ is important for determining an favorable size of each queue of the voice data queue 440. If the sample rate conversion frequency ratio $F_c$ is large, data is accessed from the queue at a high rate so a large queue is advantageous for reducing the servicing of the queue. However, if the queue is too large, the audio wavetable synthesizer integrated circuit 310 must include a large amount of memory, disadvantageously increasing the size of the circuit.

The audio wavetable synthesizer integrated circuit 310 processes all of the data for a single voice at one time so that the size of the queue for handling a single voice determines the performance of the audio performance computer system 300. If the queue for storing data for a single voice is small, the audio wavetable synthesizer integrated circuit 310 must frequently request data from the system memory 306, reducing performance by increasing traffic on the PCI bus 320 and delaying processing of audio signals. Using a small queue, performance is audio processing performance is further reduced when the sample rate conversion frequency ratio $F_c$ is large.

The voice data queue 440 is therefore designed in a vertical cache structure having large voice queues but reducing the number of voice queues that are active at one time. In particular, the vertical cache structure includes a substantially reduced set of active voice queues, typically three or four, rather than having an active voice queue for each performed voice. Each of the active voice queues in the vertical cache structure is substantially larger than the voice queues in a system having an active voice queue for each performed voice. In this manner, data communication between the system memory 306 and the audio DSP 456 is greatly reduced while the queue memory size in the audio wavetable synthesizer integrated circuit 310 is not increased.

In the vertical cache structure, the illustrative voice data queue 440 includes four queues instead of having a queue allocated to each voice. Data from the system memory 306 is accessed to fill a single queue at a time so that the audio DSP 456 operates on a plurality of frames in a "frame batch" for each voice at one time. In the illustrative embodiment, a frame batch includes 32 frames. The PCI-Audio data controller 460 requests 32 frames of data for a single voice from the system memory 306. The 32 frames of single-voice data are communicated from the system memory 306 to the voice data queue 440 in a burst mode. The audio DSP 456 processes the 32 frames of data for the single voice and the results are accumulated by the audio DSP 456 and stored in the audio SRAM 462. The PCI-Audio data controller 460 then requests 32 frames of data for a next single voice, progressing through all 32 voices but processing the frame batch data for each voice separately.

The PCI bus 320, like most buses, operates more efficiently when data is communicated in a block at one time rather than by transmitting data a single piece at a time. Thus, the vertical cache structure advantageously processes multiple samples of a single voice at one time.

The number of voice queues in the voice data queue 440, typically three or four voice queues, is selected so substantially increase the size of a single voice queue while maintaining the total size of the voice data queue 440 at a reasonable level. Multiple voice queues are implemented so that data is loaded from the system memory 306 to a first voice queue of the voice data queue 440 while data is a written from a second voice queue to the audio DSP 456 so that the first voice queue is filled as the data from the second voice queue is processed. More than two voice queues are implemented to assure that the signal processing circuits of the audio DSP 456 remain busy, reducing the possibility that a queue will become empty due to bus latencies or congestion on the PCI bus 320. The latencies involved in communicating data via the PCI bus 320 vary widely and unpredictably based on the specifications and load of the audio performance computer system 300. The processing of the audio DSP 456 proceeds at a generally steady pace while the filling of the queues from them system memory 306 via the PCI bus 320 is highly variable.

The operation of the voice data queue 440 is illustrated by an example in which voice 0 data is previously loaded into a voice queue 0 and is presently accessed by the signal processor circuits of the audio DSP 456. Voice 1 data is filled into voice queue 1 of the voice data queue 440, voice 2 data is filled into voice queue 2, and voice 3 data is filled into voice queue 3 as the voice 0 data is processed by the audio DSP 456. When processing of the voice 0 data is complete, the audio DSP 456 begins processing of the voice 1 data from the voice 1 queue while filling of voice queues 1, 2 and 3 is completed if such filling is not yet completed and voice queue 0 is filled with voice 4 data. In subsequent cycles, voice 5–31 data are filled into the voice data queue 440 and processed. In this manner, data from the system memory 306 is filled into the voice data queue 440 over the PCI bus 320 asynchronously from the processing of the queued data by the audio DSP 456.

Mixing is performed to mix the signals of the multiple voices to create a composite sound. The audio DSP 456 also performs other processing such as separation of a voice into two channels for stereo performance, balancing the signal between different channels, performing three-dimensional localization of multiple output signal channels and other operations.

The DSP registers 458 include an audio DSP system memory address register (ADSMA) and an audio DSP master control register (ADMC). The audio DSP system memory address register (ADSMA) has a format, as follows:

| 31:0 |
|---|
| SAP |

where SAP is a system address pointer. The system address pointer specifies the system address pointer for master data accesses.

The audio DSP master control register (ADMC) has a format, as follows:

| 15:9 | 8 | 7:6 | 5:0 |
|---|---|---|---|
| Reserved | RdWr_L | TMPqueue | DWCount |

where DWCount is a doubleword (DWORD) count, TMPqueue is a TMP-bus queue number, and RdWr_L is a read-write bit. DWCount specifies the number of double words (DWORDs) to be accessed from system memory 306 in a PCI burst. TMPqueue specifies which of four data queues on the TMP bus 432 is the source or destination of the data. The read-write bit RdWr_L, when reset, specifies that the system memory master access is to originate from the PCI master write data FIFO 420 and be written to system memory 306. The read-write bit RdWr_L, when set, specifies that the system memory access is to originate from system memory 306 and be sent to the PCI master read data FIFO 418, The PCI bus interface unit 402 includes a bus interface circuit 410, a master state machine 412, and a target state machine 414. The PCI bus interface unit 402 also includes a PCI bus master control unit 416, a PCI master read data FIFO 418, a PCI master write data FIFO 420, a target data to bus converter 422, and configuration registers 424.

The bus interface circuit 410 is directly connected to the PCI interface 320, the master state machine 412 and the target state machine 414. The bus interface circuit 410 includes I/O pad state machines, latches, decoding circuits, parity generation circuits and multiplexers for handling data transfer to the audio wavetable synthesizer 310. The I/O pad state machines of the bus interface circuit 410 are simple controllers for PCI output signals. The master state machine 412 and the target state machine 414 generate control signals for controlling input and output signals of the PCI bus interface unit 402 according to the PCI protocol and track the current state of the PCI bus 320. The bus interface circuit 410, master state machine 412, and target state machine 414 are designed to comply to PCI bus timing rules and generally operate as slaves to the PCI bus 320 and to the PCI bus master control unit 416.

Target data accesses are controlled by the target state machine 414 and pass from the PCI bus 320 through the bus interface circuit 410 to a target address and data (TAD) bus 426. The TAD bus 426 has a width of 32 bits. The target data accesses are passed from the TAD bus 426 to a destination determined by the target address, either the configuration registers 424 on the TAD bus 426 or through the target data to bus converter 422 to the general (GEN) bus 428. The GEN bus 428 conveys target data accesses to the audio DSP 456. The GEN bus 428 has a width of sixteen bits. The target data to bus converter 422 converts 32-bit data from the TAD bus 426 into a 16-bit data form for placement on the GEN bus 428. The target data to bus converter 422 includes configuration registers and decoders for converting the data. Target data accesses are generated by the CPU 302 and controlled by the target state machine 414 to control operations of the audio DSP 456 and the PCI bus master control unit 416.

Master data are passed from the PCI bus 320 through the bus interface circuit 410 to a master address and data (MAD) bus 428. Master data includes wavetable data read from the wavetable memory 200. The MAD bus 430 has a width of 32 bits. Under control of the PCI bus master control unit 416, data is passed from the MAD bus 430 to the GEN bus 428 or to the temporary (TMP) bus 432 through the PCI master read data FIFO 418. The TMP bus 432 carries sample voice data to the voice data queue 440. The TMP bus 432 has a width of 32 bits. Also under control of the PCI bus master control unit 416, data is passed from the GEN bus 428 or from the TMP bus 432 to the MAD bus 430 through the PCI master write data FIFO 420.

The PCI bus master control unit 416 is connected to the MAD bus 430, the GEN bus 428 and the TMP bus 432 for communicating master data. The PCI bus master control unit 416 manages interfacing to the master state machine 412 to initiate master bus cycles. The PCI bus master control unit 416 generates addresses for accessing data in the system memory 306. The PCI bus master control unit 416 includes an array of programmable registers (not shown) which are programmed to generate automatic data access signals to the system memory 306. The PCI bus master control unit 416 then directs the transfer of the accessed data to either the GEN bus 428 or the TMP bus 432. The programmable registers in the PCI bus master control unit 416 are programmed to generating both read and write accesses to the system memory 306. The programmable registers in the PCI bus master control unit 416 are programmed by a system CPU 302 using target accesses and by the audio synthesizer 408. Accordingly, master bus cycles are initiated both from the system CPU 302 and from the audio synthesizer 408.

In the case of master write signals, the PCI bus master control unit 416, when the access is requested, moves data from the buffer of a requesting machine (not shown) on the PCI bus 320 into the PCI master write data FIFO 420. In one example, the PCI bus master control unit 416 moves data from an audio code record path FIFO (not shown) into the PCI master write data FIFO 420. The PCI bus master control unit 416 then performs a plurality of master bus cycles.

In the case of master read cycles, the PCI bus master control unit 416 first performs the master bus cycles to move data from the system memory 306 into the PCI master read data FIFO 418. Then the PCI bus master control unit 416 moves the data to the buffer of the requesting machine on the PCI bus 320.

The audio wavetable synthesizer 310 includes many features for improving audio performance by increasing data flow from the PCI bus 320 to the audio DSP 456. The highest performance data flowpath is the master data flowpath through the MAD bus 430 and either the PCI master read data FIFO 418 or the PCI master write data FIFO 420, depending on the data flow direction. The master data flow path is isolated from the 16-bit GEN bus 428 and the 16-bit synthesizer bus 450, instead traversing the TMP bus 432 to prevent the buses internal to the audio wavetable synthesizer 310 from choking other system data flow through the audio wavetable synthesizer 310.

The remainder of the data flow, not including the master data flowpath, traverses the GEN bus 428. Target data accesses typically pass through the GEN bus 428 to destinations including the system memory 306 and various internal registers throughout the audio wavetable synthesizer 310. Low bandwidth master data also flows via the GEN bus 428. The synthesizer bus 450 in the audio synthesizer 408 is a separate extension to the GEN bus 428 and forms a primary communication bus for the synthesizer bus controller 454, the audio DSP 456, the PCI-Audio data controller 460, and the audio SRAM 462. The synthesizer bus 450 is isolated from the GEN bus 428 so that data flows over the synthesizer bus 450 without a heavy amount of bus traffic choking the GEN bus 428. Both the GEN bus 428 and the synthesizer bus 450 use the same communication protocol and an identical addressing scheme.

In the described embodiment, the audio DSP 456 includes an audio digital-to-analog converter (DAC) (not shown) operating at a rate of 44,100 samples per second (44.1 kHz). Accordingly, the output data rate of the audio DSP 456 is 44.1 kHz, although the input data rate can be substantially any rate. One sample period is called a frame. A group of 32 samples is called a frame batch. The audio DSP 456 includes two 32-sample stereo accumulators (not shown) for passing data to the audio DAC. As a first audio DAC is updated with the next frame batch for transfer to the audio DAC, a second audio DAC passes current data to the audio DAC.

Nearly all blocks of the audio wavetable synthesizer 310 operate synchronously at the clock rate of the PCI bus 320, typically 33 MHz. The blocks operating at the clock rate of the PCI bus 320 include the PCI bus interface unit 402, the audio synthesizer 408 and all buses. The audio code 404 and a telephony code (not shown), which may be included in other embodiments of an audio wavetable synthesizer, operate at various selected rates that are typically based upon a 16.9344 MHz oscillator.

Figure 5:
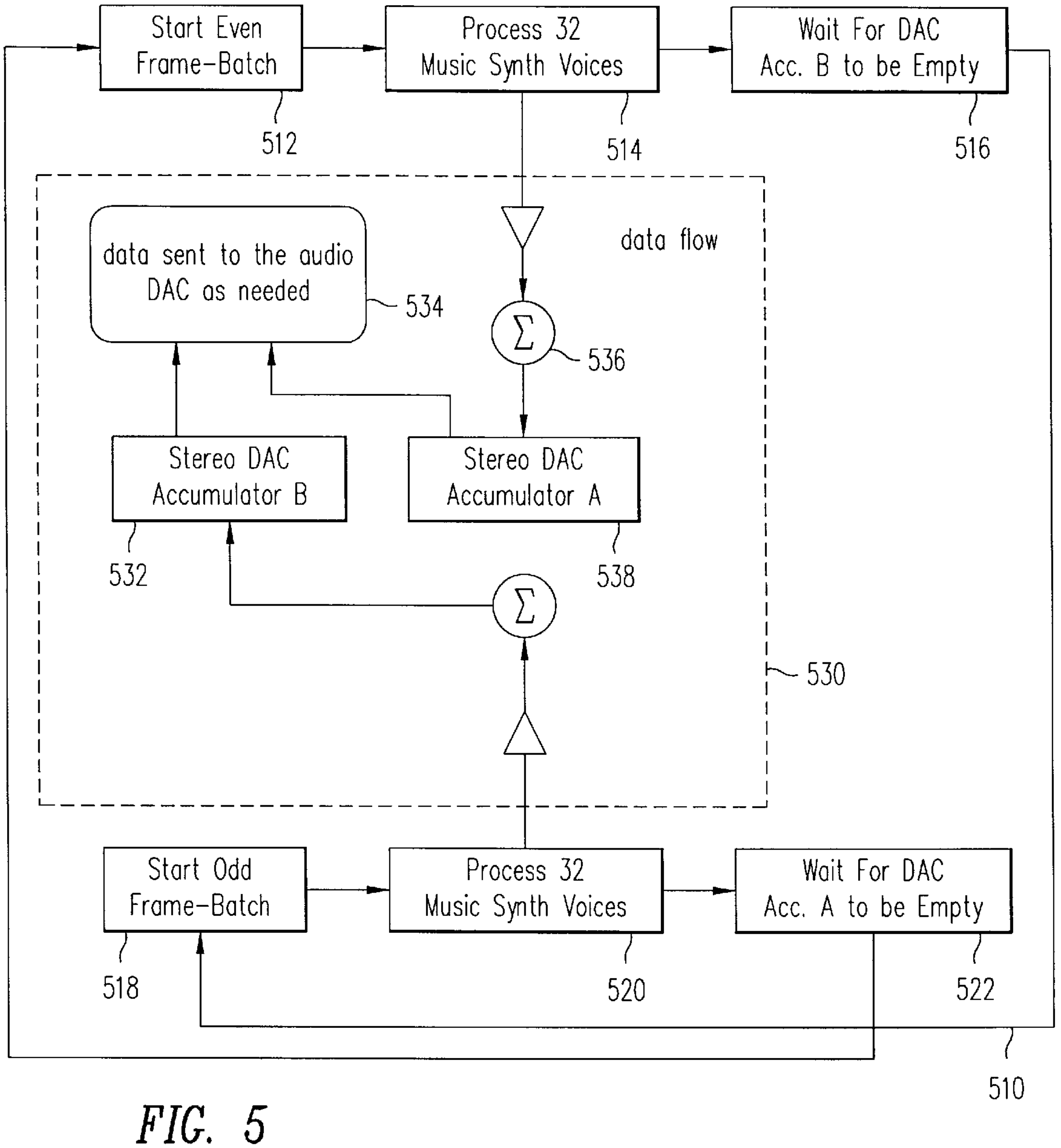
FIG. 5 is a flow chart illustrating the basic flow path for data operated upon by the audio DSP including a data flow of an audio DSP procedure and a data flow of DAC accumulators A and B.

Referring to FIG. 5, a flow chart illustrates the basic flow path for data operated upon by the audio DSP 456 including a data flow of an audio DSP procedure 510 and a data flow of the two 32-sample stereo accumulators (A and B) 530 to the audio DAC. Specifically, the audio DSP 456 begins operating on an even frame batch 512 when accumulator A is empty. The audio DSP 456 processes 32 synthesized voice samples 514, typically while accumulator B 532 sends data to the audio DAC according to the timing of the audio DAC 534. As the audio DSP 456 processes the 32 synthesized voice samples, the data is accumulated 536 in the stereo DAC accumulator A 538. When processing of the 32 synthesized voice samples is complete, the audio DSP 456 waits for DAC accumulator B to clear 516. When DAC accumulator B is clear, the audio DSP 456 begins operating on an odd frame batch 518, processing the next 32 synthesized voice samples 520 while stereo DAC accumulator 538 sends data to the audio DAC 534.

Figure 6:
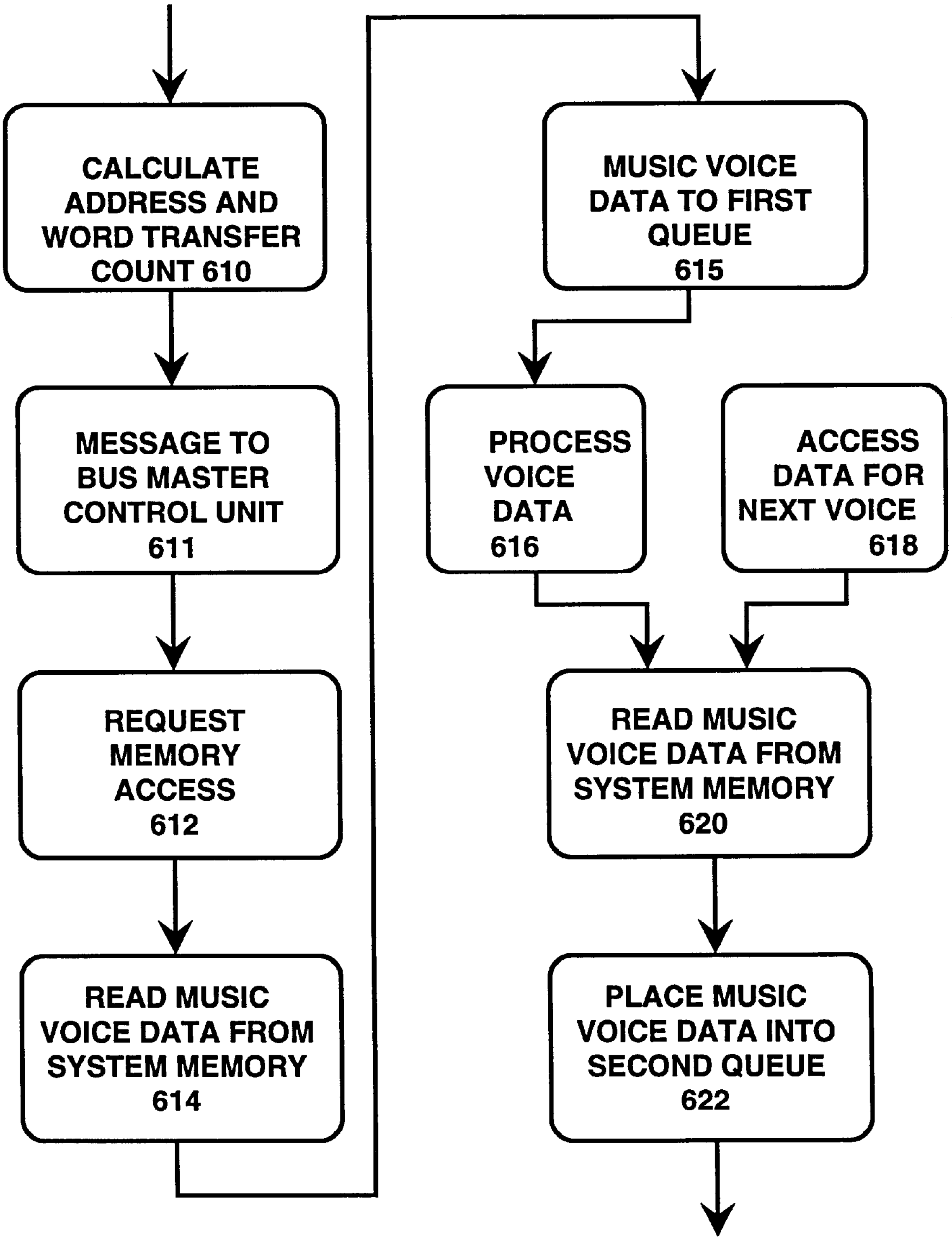
FIG. 6 is a flow chart depicting the operations of the audio wavetable synthesizer integrated circuit in transferring data from the system memory and generating an audio signal.

FIG. 6 is a flow chart depicting the operations of the audio wavetable synthesizer integrated circuit 310 in transferring data from the system memory 306 to the audio DSP 456 and generating an audio signal. The audio DSP 456 collaborates with the PCI-Audio data controller 460 to insure that the audio DSP 456 is never required to wait for data from the system memory 306. When the audio DSP 456 is to begin processing music synthesis voices, the PCI-Audio data controller 460 first calculates the address in system memory 306 and the number of double words to be transferred in step 610. The audio DSP 456 communicates the message to the PCI bus master control unit 416 in step 611 which requests the memory access in step 612. The PCI bus master control unit 416 responds to receipt of data by reading, in step 614, the music voice data from system memory 306 and placing the music voice data into a first queue of the voice data queue 440 on the TMP bus 432 in step 615. At this time, the audio DSP 456 is ready to process 32 samples of the data stored in the voice data queue 440. The audio DSP 456 processes the data in step 616. While the audio DSP 456 performs processing calculations, the PCI-Audio data controller 460 programs the PCI bus master control unit 416 to access data for the next voice in step 618. The PCI bus master control unit 416 responds to receipt of data by reading, in step 620, the music voice data from system memory 306 and placing the music voice data into a second queue of the voice data queue 440 in step 622.

Figure 7:
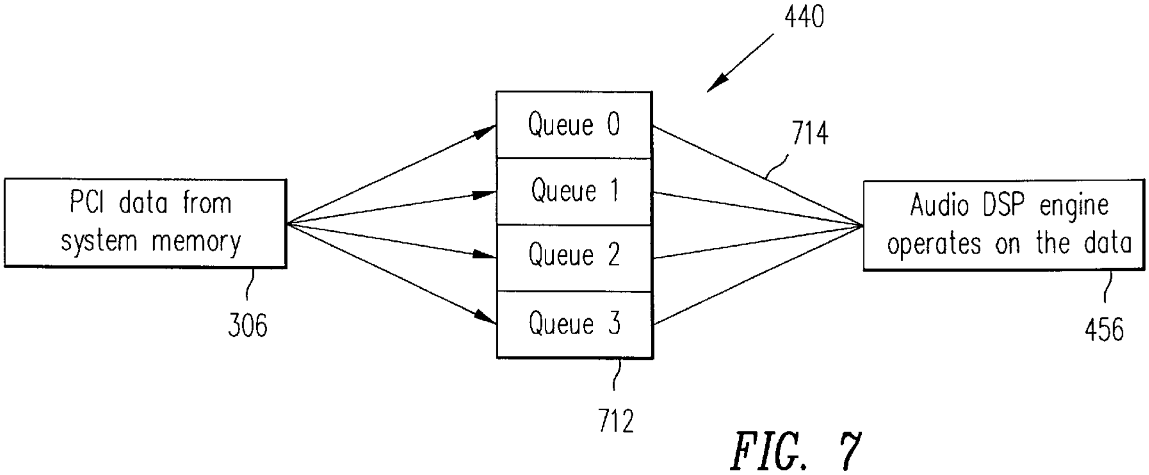
FIG. 7 is a schematic block diagram which illustrates the communication of music voice data from a system memory for performance by an audio DSP.

Referring to FIG. 7, a schematic block diagram shows a path of communication of music voice data from a system memory 306 for performance by the audio DSP 456. PCI data 710 from the system memory 306 is received in four independent queues 712 in the voice data queue 440. Data from the four queues is communicated to the audio DSP 456 which operates on the data 714. The audio DSP 456 collaborates with the PCI-Audio data controller 460 and the four independent music voice channels of the voice data queue 440 to insure that the audio DSP 456 rarely waits for data from the system memory 306.

Figure 8:
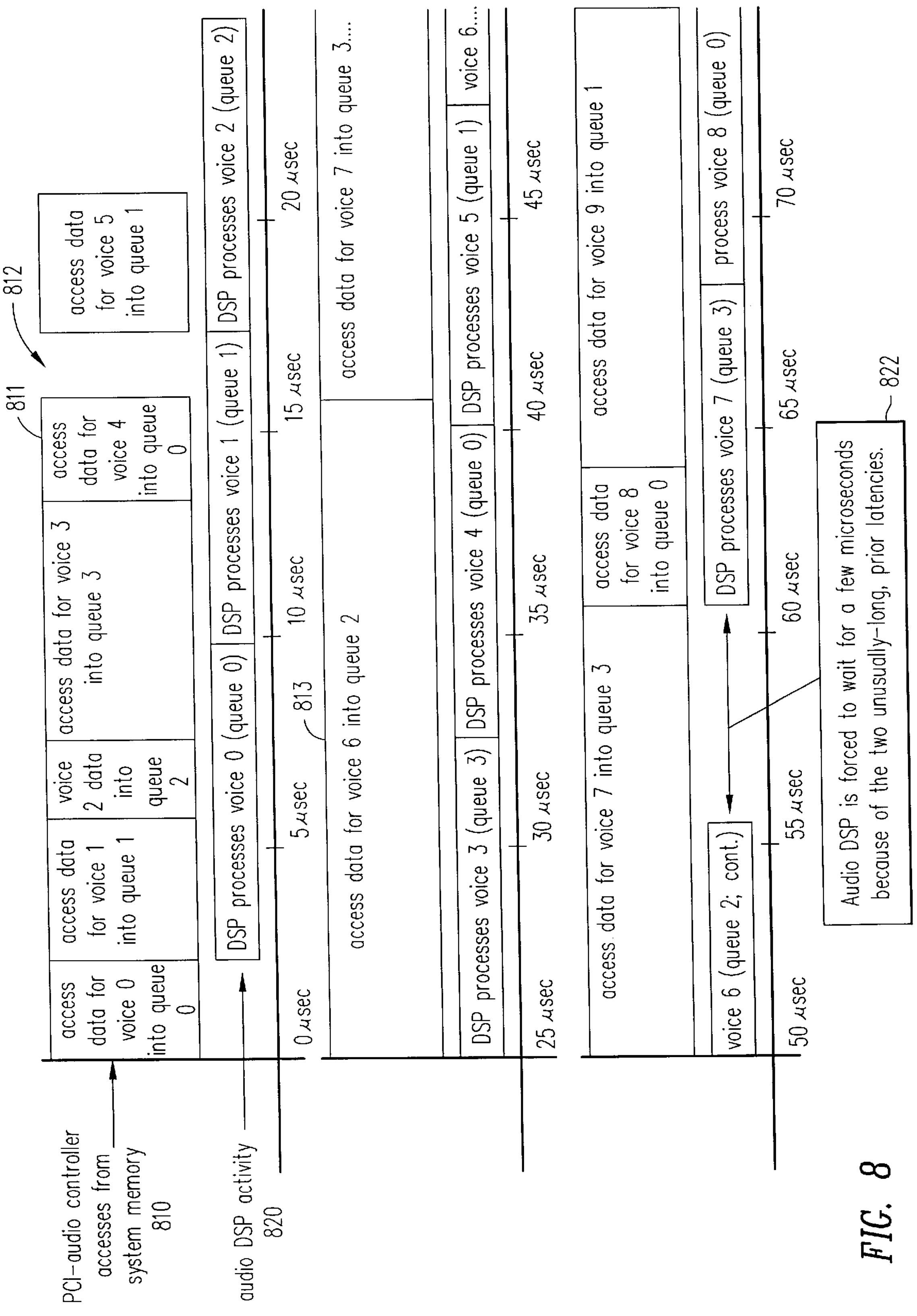
FIG. 8 is a timeline-type timing diagram showing the timing of audio DSP operations in conjunction with the timing of PCI-Audio data controller operations.

FIG. 8 is a timeline-type timing diagram showing the timing of audio DSP 456 operations in conjunction with the timing of PCI-Audio data controller 460 operations. In particular, FIG. 8 shows a timeline of two signals. A first signal is system memory accesses 810 by the PCI-Audio data controller 460. A second signal is activity 820 of the audio DSP 456.

Timing of system memory accesses 810 by the PCI-Audio data controller 460 varies widely, mostly due to latency in access grants of the PCI bus interface 320. For example, a gap 812 in the system memory accesses 810 is shown following the access of data for voice 4 811. Also, the access interval for voice 6 813 is very lengthy.

Conversely, the audio DSP 456 regularly uses an interval that consistently falls within the range from six to eight microseconds to process a voice.

The audio DSP 456 operates in conjunction with the PCI-Audio data controller 460 to distribute music signal processing substantially uniformly over time despite large variations in PCI latency over time, The audio DSP 456 only interrupts operation, as shown by 822, to wait for data when unusually long PCI latencies occur. In general, if all four queues in the voice data queue 440 are loaded with data, three times the interval used by the audio DSP 456 to process a voice, generally in a range from 18 to 24 microseconds, is sufficient to force the audio DSP 456 to pause. The audio DSP 456 is specified to complete processing for a frame-batch in less than 480 microseconds for a total frame duration of 725 microseconds so that occasional latency aberrations do not affect performance of the audio signal. Only when the audio DSP 456 is forced to wait for more than 245 microseconds (725 $\mu$s–480 $\mu$s) during a single frame-batch does the audio DSP 456 begin losing data. Thus, data is lost only when the PCI bus interface 320 is utilized at near full capacity.

The audio DSP 456 operates on 32 samples at one time and is specified to complete all operations in less than 725 μs (32×1/44100). The specification of 725 μs assumes that the audio DSP 456 is never kept waiting for bus accesses and data, an unrealistic assumption. Therefore, a time cushion of 245 μs is specified so that the audio DSP 456 is to complete all operations in less than 480 μs to allow for pause conditions of the audio DSP 456 due to slow accesses to the PCI bus interface 320 or slow accesses to internal buses, GEN bus 428 and synthesizer bus 450.

While the invention has been described with reference to various embodiments, it will be understood that these embodiments are illustrative and that the scope of the invention is not limited to them. Many variations, modifications, additions and improvements of the embodiments described are possible. For example, although the vertical wavetable cache is described in terms of a system which is connected to a PCI bus interface, other interfaces such as the Small Computer Systems Interface (SCSI), the 486 bus interface, the ISA interface, the EISA interface, the VESA interface and the like may also be employed.

What is claimed is:

1. An audio wavetable synthesizer for usage with a computer system including a processor, a system memory coupled to the processor, and a bus coupled to the processor, the system memory including an audio signal wavetable memory storing audio data in a plurality of voices, the audio wavetable synthesizer comprising:

a bus interface unit coupled to the bus for receiving audio data;

an audio cache coupled to the bus interface unit including a plurality of voice data queues, each voice data queue receiving audio data for a single voice, the number of queues being substantially smaller than the total number of voices stored in the system memory;

an audio signal processor coupled to the audio cache for receiving and processing voice data from a voice data queue, one queue at a time.

2. An audio table synthesizer according to claim 1 further comprising:

a controller for controlling the audio cache to receive voice data from the system memory in a first voice data queue and to transmit voice data to the audio signal processor from a second voice data queue.

3. An audio table synthesizer according to claim 1 further comprising:

a controller for controlling the audio cache and the audio signal processor to cycle through the voices stored in the system memory so that voice data of all voices is received by the audio cache and processed by the audio signal processor.

4. An audio table synthesizer according to claim 1 wherein one single-voice queue in the audio cache is allocated for eight or more voices stored in the system memory.

5. An audio wavetable synthesizer for use with a computer system including a processor, a system memory coupled to the processor, and a bus coupled to the processor, the system memory including an audio signal wavetable memory storing audio data in a plurality of voices, the audio wavetable synthesizer comprising:

a bus interface unit coupled to the bus for receiving audio data;

an audio cache coupled to the bus interface unit including a plurality of voice data queues, each voice data queue receiving audio data for a single voice, the number of queues being substantially smaller than the total number of voices stored in the system memory;

an audio signal processor coupled to the audio cache for receiving and processing voice data from a voice data queue, one queue at a time; and a controller for controlling the system memory to transmit audio data of a single voice to a single queue of the audio cache in a plurality of frames of a single voice in a frame batch transmission and for controlling the audio signal processor to process the audio data in a plurality of frames of a single voice.

6. An audio table synthesizer according to claim 5 further comprising:

an accumulator coupled to the audio signal processor for accumulating and storing a sum processed frames of voice data from the plurality of voice data queues.

7. A computer system comprising:

a processor;

a system memory coupled to the processor and including an audio signal wavetable memory storing audio data in a plurality of voices;

a system bus coupled to the processor; and an audio wavetable synthesizer coupled to the system bus including:

a bus interface unit coupled to the bus for receiving audio data;

an audio cache coupled to the bus interface unit including a plurality of voice data queues, each voice data queue receiving audio data for a single voice, the number of queues being substantially smaller than the total number of voices stored in the system memory;

an audio signal processor coupled to the audio cache for receiving and processing voice data from a voice data queue, one queue at a time.

8. A computer system according to claim 7 further comprising:

a controller for controlling the audio cache to receive voice data from the system memory in a first voice data queue and to transmit voice data to the audio signal processor from a second voice data queue.

9. A computer system according to claim 7 further comprising:

a controller for controlling the audio cache and the audio signal processor to cycle through the voices stored in the system memory so that voice data of all voices is received by the audio cache and processed by the audio signal processor.

10. A computer system according to claim 7 wherein one single-voice queue in the audio cache is allocated for eight or more voices stored in the system memory.

11. A computer system according to claim 7 wherein each single-voice queue in the audio cache has a depth of 64 bytes or more.

12. A computer system comprising:

a processor;

a system memory coupled to the processor and including an audio signal wavetable memory storing audio data in a plurality of voices;

a system bus coupled to the processor;

an audio wavetable synthesizer coupled to the system bus including:

a bus interface unit coupled to the bus for receiving audio data;

an audio cache coupled to the bus interface unit including a plurality of voice data queues, each voice data queue receiving audio data for a single voice, the number of queues being substantially smaller than the total number of voices stored in the system memory;

an audio signal processor coupled to the audio cache for receiving and processing voice data from a voice data queue, one queue at a time; and a controller for controlling the system memory to transmit audio data of a single voice to a single queue of the audio cache in a plurality of frames of a single voice in a frame batch transmission and for controlling the audio signal processor to process the audio data in a plurality of frames of a single voice.

13. A computer system according to claim 12 further comprising:

an accumulator coupled to the audio signal processor for accumulating and storing a sum processed frames of voice data from the plurality of voice data queues.

14. A method of operating an audio wavetable synthesizer for usage with a computer system including a processor, a system memory coupled to the processor, and a bus coupled to the processor, the method comprising the steps of:

storing audio data in an audio signal wavetable within the system memory in a plurality of voices;

transmitting audio data a single voice at one time from the system memory to an audio cache via a bus interface unit coupled to the bus;

allocating a voice data queue of the audio cache to a single voice, the audio cache including a plurality of voice data queues, the number of voice data queues in the audio cache being substantially smaller than the total number of voices stored in the system memory;

receiving audio data for the single voice in the allocated voice data queue;

transmitting voice data from a voice data queue to an audio signal processor; and processing voice data from a voice data queue, one queue at one time in an audio signal processor.

15. A method according to claim 14 further comprising the step of:

controlling the audio cache to receive voice data from the system memory in a first voice data queue and to transmit voice data to the audio signal processor from a second voice data queue.

16. A method according to claim 14 further comprising the step of:

controlling the audio cache and the audio signal processor to cycle through the voices stored in the system memory so that voice data of all voices is received by the audio cache and processed by the audio signal processor.

17. A method according to claim 14 wherein one single-voice queue in the audio cache is allocated for eight or more voices stored in the system memory.

18. A method of operating an audio wavetable synthesizer for use with a computer system including a processor, a system memory coupled to the processor, and a bus coupled to the processor, the method comprising the steps of:

storing audio data in an audio signal wavetable within the system memory in a plurality of voices;

transmitting audio data a single voice at one time from the system memory to an audio cache via a bus interface unit coupled to the bus;

allocating a voice data queue of the audio cache to a single voice, the audio cache including a plurality of voice data queues, the number of voice data queues in the audio cache being substantially smaller than the total number of voices stored in the system memory;

receiving audio data for the single voice in the allocated voice data queue;

transmitting voice data from a voice data queue to an audio signal processor;

processing voice data from a voice data queue, one queue at one time in an audio signal processor;

controlling the system memory to transmit audio data of a single voice to a single queue of the audio cache in a plurality of frames of a single voice in a frame batch transmission; and controlling the audio signal processor to process the audio data in a plurality of frames of a single voice.

19. A method according to claim 18 further comprising the step of:

accumulating and storing a sum processed frames of voice data from the plurality of voice data queues.

20. A method of providing an audio wavetable synthesizer for usage with a computer system including a processor, a system memory coupled to the processor, and a bus coupled to the processor, the system memory including an audio signal wavetable memory storing audio data in a plurality of voices, the audio wavetable synthesizer comprising:

providing a bus interface unit coupled to the bus for receiving audio data;

providing an audio cache coupled to the bus interface unit including a plurality of voice data queues, each voice data queue receiving audio data for a single voice, the number of queues being substantially smaller than the total number of voices stored in the system memory;

providing an audio signal processor coupled to the audio cache for receiving and processing voice data from a voice data queue, one queue at a time.

21. A method according to claim 20 further comprising:

providing a controller for controlling the audio cache to receive voice data from the system memory in a first voice data queue and to transmit voice data to the audio signal processor from a second voice data queue.

22. A method according to claim 20 further comprising:

providing a controller for controlling the audio cache and the audio signal processor to cycle through the voices stored in the system memory so that voice data of all voices is received by the audio cache and processed by the audio signal processor.

23. A method according to claim 20 wherein one single-voice queue in the audio cache is allocated for eight or more voices stored in the system memory.

24. A method of providing an audio wavetable synthesizer for use with a computer system including a processor, a system memory coupled to the processor, and a bus coupled to the processor, the system memory including an audio signal wavetable memory storing audio data in a plurality of voices, the audio wavetable synthesizer comprising:

providing a bus interface unit coupled to the bus for receiving audio data;

providing an audio cache coupled to the bus interface unit including a plurality of voice data queues, each voice data queue receiving audio data for a single voice, the number of queues being substantially smaller than the total number of voices stored in the system memory;

providing an audio signal processor coupled to the audio cache for receiving and processing voice data from a voice data queue, one queue at a time; and providing a controller for controlling the system memory to transmit audio data of a single voice to a single queue of the audio cache in a plurality of frames of a single voice in a frame batch transmission and for controlling the audio signal processor to process the audio data in a plurality of frames of a single voice.

25. A method according to claim 24 further comprising:

providing an accumulator coupled to the audio signal processor for accumulating and storing a sum processed frames of voice data from the plurality of voice data queues.

* * * * *